US009926996B2

(12) United States Patent
Ueki (10) Patent No.: US 9,926,996 B2
(45) Date of Patent: Mar. 27, 2018

(54) VIBRATION-DAMPING DEVICE (71) Applicant: BRIDGESTONE CORPORATION, Tokyo (JP)

(72) Inventor: Akira Ueki, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 15/301,745

(22) PCT Filed: Apr. 2, 2015

(86) PCT No.: PCT/JP2015/060463
§ 371 (c)(1),
(2) Date: Oct. 4, 2016

(87) PCT Pub. No.: WO2015/156201
PCT Pub. Date: Oct. 15, 2015

(65) Prior Publication Data
US 2017/0030428 A1 Feb. 2, 2017

(30) Foreign Application Priority Data
Apr. 8, 2014 (JP) ................................. 2014-079418

(51) Int. Cl.
*F16F 13/10* (2006.01)
*B60K 5/12* (2006.01)
(52) U.S. Cl.
CPC .......... *F16F 13/107* (2013.01); *B60K 5/1208* (2013.01); *F16F 13/10* (2013.01)
(58) Field of Classification Search
CPC ........ F16F 13/107; F16F 13/10; B60K 5/1208
(Continued)

(56) References Cited

U.S. PATENT DOCUMENTS 3,362,508 A * 1/1968 Mayer .................... F16F 9/344
16/51
4,418,802 A * 12/1983 Fukushima ............ B60G 13/08
188/283.1
(Continued)

FOREIGN PATENT DOCUMENTS

CN 1697943 A 11/2005
CN 101813154 A 8/2010
(Continued)

OTHER PUBLICATIONS

Communication dated Apr. 24, 2017 issued by the State Intellectual Property Office of People's Republic of China in counterpart application No. 201580017769.7.
(Continued)

Primary Examiner — Thomas J Williams
(74) Attorney, Agent, or Firm — Sughrue Mion, PLLC (57) ABSTRACT

The present invention relates to a vibration-damping device (10) which is provided with: a tubular first attachment member (11) joined to one of a vibration generating unit and a vibration receiving unit; a second attachment member (12) joined to the other thereof; an elastic body (13) which joins the first attachment member (11) to the second attachment member (12); and a partition member (16) which partitions a liquid chamber in the first attachment member (11) into a first liquid chamber (14) and a second liquid chamber (15), and in which at least one of the first liquid chamber (14) and the second liquid chamber (15) has the elastic body (13) as a portion of a wall surface thereof. A vortex chamber unit (30) through which the first liquid chamber (14) communicates with the second liquid chamber (15) is formed in the partition member (16).

4 Claims, 4 Drawing Sheets

(58) Field of Classification Search
USPC .................................................. 267/140.13
See application file for complete search history.

(56) References Cited

U.S. PATENT DOCUMENTS

| | | | | |
|---|---|---|---|---|
| 4,457,409 | A * | 7/1984 | Fukushima | F16F 9/344 137/513.3 |
| 4,483,521 | A * | 11/1984 | Kakimoto | F16F 13/107 267/140.13 |
| 4,515,252 | A * | 5/1985 | Hidaka | F16F 9/344 137/512.1 |
| 4,811,934 | A | 3/1989 | Bebermeier et al. | |
| 5,070,972 | A * | 12/1991 | Dourson | F16F 9/3214 137/808 |
| 7,070,175 | B2 | 7/2006 | Sakata | |
| 7,802,777 | B2 | 9/2010 | Katayama et al. | |
| 8,454,002 | B2 * | 6/2013 | Nishi | F16F 13/107 267/140.11 |
| 8,894,051 | B2 | 11/2014 | Yamamoto et al. | |
| 9,046,147 | B2 | 6/2015 | Tsutsumi | |
| 2005/0225015 | A1 | 10/2005 | Sakata | |
| 2010/0213650 | A1 | 8/2010 | Katayama et al. | |
| 2012/0074629 | A1 * | 3/2012 | Yamamoto | F16F 13/106 267/140.13 |
| 2012/0292838 | A1 | 11/2012 | Yamamoto et al. | |
| 2012/0306135 | A1 | 12/2012 | Tsutsumi | |
| 2017/0016508 | A1 * | 1/2017 | Ueki | F16F 13/10 |

FOREIGN PATENT DOCUMENTS

| | | |
|---|---|---|
| CN | 102713341 A | 10/2012 |
| CN | 102725558 A | 10/2012 |
| EP | 2420697 A1 | 2/2012 |
| JP | S57-118921 A | 7/1982 |
| JP | 60-073147 A | 4/1985 |
| JP | 62-028543 A | 2/1987 |
| JP | 2007-120598 A | 5/2007 |
| JP | 2009-052696 A | 3/2009 |
| JP | 2011-241928 A | 12/2011 |
| WO | 2014/196382 A1 | 12/2014 |

OTHER PUBLICATIONS

Communication dated May 3, 2017 issued by the European Patent Office in counterpart application No. 15776924.1.

* cited by examiner

VIBRATION-DAMPING DEVICE

CROSS REFERENCE TO RELATED APPLICATIONS

This application is a National Stage of International Application No. PCT/JP2015/060463 filed Apr. 2, 2015, claiming priority based on Japanese Patent Application No. 2014-079418 filed Apr. 8, 2014, the contents of all of which are incorporated herein by reference in their entirety.

TECHNICAL FIELD

The present invention relates to a vibration-damping device which is applied to, for example, vehicles, industrial machines, and so on and which absorbs and attenuates vibrations of vibration generating units such as engines.

Priority is claimed on Japanese Patent Application No. 2014-079418, filed Apr. 8, 2014, the content of which is incorporated herein by reference.

BACKGROUND ART

A constitution disclosed in, for example, Patent Document 1 is known as such a type of vibration-damping device. Such a vibration-damping device includes a tubular first attachment member joined to one of a vibration generating unit and a vibration receiving unit, a second attachment member joined to the other of the vibration generating unit and the vibration receiving unit, an elastic body which joins the first attachment member to the second attachment member, and a partition member which partitions a liquid chamber in the first attachment member in which a liquid is sealed into a first liquid chamber and a second liquid chamber. The vibration-damping device further includes a first restriction passage and a second restriction passage through which the first and second liquid chambers communicate with each other, a cylinder chamber which is provided between the first liquid chamber and the second liquid chamber, and a plunger member which is arranged movably between an open position and a closed position in the cylinder chamber.

A plurality of types of vibrations with different frequencies such as, for example, idle vibrations and shake vibrations are input to the vibration-damping device. For this reason, resonance frequencies of the first restriction passage and the second restriction passage are set (tuned) to frequencies of the different types of vibrations in the vibration-damping device. The plunger member is moved between the open position and the closed position in accordance with frequencies of the input vibrations so that a restriction passage through which the liquid flows is switched between the first restriction passage and the second restriction passage.

CITATION LIST

Patent Document

[Patent Document 1]
Japanese Unexamined Patent Application, First Publication No. 2007-120598

SUMMARY OF INVENTION

Technical Problem

However, there is room for improve terms of simplification of a structure and facilitation of manufacture in the conventional vibration-damping device.

Also, in the conventional vibration-damping device, when unintentional vibrations such as, for example, minute vibrations which are higher in frequency and remarkably smaller in amplitude than a resonance frequency of the restriction passage determined by a path length, a cross-sectional area, and so on of the restriction passage are input, the dynamic spring constant increases due to clogging of the restriction passage or the like. As a result, this may affect product features of the vibration-damping device such as ride comfort of vehicles.

The present invention was made in view of the above-described circumstances, and an object of the present invention is to provide a vibration-damping device in which simplification of a structure and facilitation of manufacture can be achieved while product features are secured.

Solution to Problem

In order to accomplish the object, the present invention suggests the following means.

A first aspect related to the present invention is a vibration-damping device in which at least one of a first liquid chamber and a second liquid chamber has an elastic body as a portion of a wall surface thereof, in which the vibration-damping device includes: a tubular first attachment member joined to one of a vibration generating unit and a vibration receiving unit; a second attachment member joined to the other of the vibration generating unit and the vibration receiving unit; an elastic body which joins the first attachment member to the second attachment member; and a partition member which partitions a liquid chamber in the first attachment member in which a liquid is sealed into the first liquid chamber and the second liquid chamber. In the vibration-damping device, the partition member is formed with a vortex chamber unit through which the first liquid chamber communicates with the second liquid chamber. The vortex chamber unit is provided with an annular vortex chamber, a first communicating section through which the vortex chamber communicates with the first liquid chamber, and a second communicating section through which the vortex chamber communicates with the second liquid chamber. At least one of the first communicating section and the second communicating section includes a rectifying passage which extends outward in the radial direction from a portion of the partition member which is more inward in a radial direction of the vortex chamber than the vortex chamber and are open at an inner circumferential surface of the vortex chamber which faces the outside in the radial direction in a circumferential direction of the vortex chamber. The vortex chamber is formed to rotate a liquid flowing into the vortex chamber from the rectifying passage in accordance with a flow velocity thereof.

In this case, when vibrations are input, and a liquid flows through the vortex chamber between the first liquid chamber and the second liquid chamber, if a flow velocity of the liquid flowing into the vortex chamber from the rectifying passage is sufficiently high, a swirl flow of the liquid is formed in the vortex chamber. Thus, pressure loss of the liquid is increased due to, for example, energy toss occurring when the swirl flow is formed, energy loss due to friction between the liquid and wall surfaces of the vortex chamber, and so on, and the vibrations are thus absorbed and attenuated. On the other hand, if the flow velocity of the liquid flowing into the vortex chamber from the rectifying passage is low, the rotation of the liquid in the vortex chamber is suppressed. Thus, an increase in a dynamic spring constant is suppressed due to the liquid which smoothly passes through the vortex chamber.

According to the vibration-damping device, the swirl flow of the liquid is formed in the vortex chamber so that the pressure loss of the liquid is increased, and the vibrations can thus be absorbed and attenuated. For example, when normal vibrations such as idle vibrations and shake vibrations are input, the vibrations can be absorbed and attenuated in accordance with the flow velocity of the liquid irrespective of the frequencies of the vibrations. Also, since the rectifying passage is open at the inner circumferential surface of the vortex chamber in the circumferential direction of the vortex chamber, a size of the swirl flow is secured by increasing an outer diameter of the vortex chamber, and the pressure loss of the liquid can thus be reliably increased. In addition, the rectifying passage is disposed inside the vortex chamber in the radial direction so that the compactness of the vibration-damping device can be realized. Therefore, simplification of a structure and facilitation of manufacture can be achieved while a plurality of kinds of vibrations having different frequencies are absorbed and attenuated.

Also, since an increase in a dynamic spring constant is suppressed in a state in which the flow velocity is low and the rotation of the liquid in the vortex chamber is suppressed, when the flow velocity of the liquid is lower than that when normal vibrations are input, such as when unintentional vibrations such as, for example, minute vibrations higher in frequency and remarkably lower in amplitude than the normal vibrations are input, the increase in the dynamic spring constant can be suppressed. Thus, product features of the vibration-damping device can be easily secured.

In a second aspect of the present invention, in the vibration-damping device of the first aspect, the rectifying passage is included in both of the first communicating section and the second communicating section.

In this case, since the rectifying passages are included in both of the first communicating section and the second communicating section, the liquid which flows into the second liquid chamber from the first liquid chamber is caused to flow into the vortex chamber via the first rectifying passage serving as the rectifying passage included in the first communicating section so that the pressure loss can be increased, and the liquid which flows into the first liquid chamber from the second liquid chamber is also caused to flow into the vortex chamber via the second rectifying passage serving as the rectifying passage included in the second communicating section so that the pressure loss of the liquid can be increased. Thus, the vibrations can be effectively absorbed and attenuated.

In a third aspect of the present invention, in the vibration-damping device of the second aspect, a first rectifying passage included in the first communicating section as the rectifying passage and a second rectifying passage included in the second communicating section as the rectifying passage extend outward in the radial direction and gradually extend in common in one direction in the circumferential direction.

In this case, after the liquid flowing into the vortex chamber from the first communicating section via the first rectifying passage rotates in the vortex chamber in the one direction in the circumferential direction, the liquid is caused to flow into the second communicating section via the second rectifying passage. At this time, since the second rectifying passages extend outward in the radial direction in common with the first rectifying passages and extend in one direction in the circumferential direction, a direction in which the liquid rotates in the vortex chamber in the circumferential direction and a direction in which the second rectifying passages extend in the circumferential direction can be commonly set to be the one direction in the circumferential direction. Thus, it is difficult for the liquid which rotates in the vortex chamber to flow into the second rectifying passages, and thus the liquid can efficiently rotate in the vortex chamber, in other words, a sufficient distance to move the liquid can be secured, and the pressure loss of the liquid can thus be more reliably increased.

Also, after the liquid flowing into the vortex chamber from the second communicating section via the second rectifying passage rotates in the vortex chamber in the one direction in the circumferential direction, the liquid is caused to flow into the first communicating section via the first rectifying passage. At this time, since the first rectifying passages extend outward in the vortex chamber radial direction in common with the second rectifying passages and extend in the one direction in the circumferential direction, the direction in which the liquid rotates in the vortex chamber in the circumferential direction and a direction in which the first rectifying passages extend in the circumferential direction can be commonly set to be the one direction in the circumferential direction. Thus, it is difficult for the liquid which rotates in the vortex chamber to flow into the first rectifying passages, and thus the liquid can efficiently rotate in the vortex chamber. In other words, a sufficient distance to move the liquid can be secured, and the pressure loss of the liquid can thus be more reliably increased.

In the fourth aspect related to the present invention, in the vibration-damping device according to any one of the first to third aspects, a communicating section of the first communicating section and the second communicating section which is included in the rectifying passage is provided with a relay chamber of the partition member which is more inward in the radial direction than the vortex chamber. The relay chamber communicates with the first liquid chamber or the second liquid chamber via an opening which is open in an axial direction of the vortex chamber, and the rectifying passage extends outward in the radial direction from an inner circumferential surface of the relay chamber which faces the inside in the radial direction and is open at the inner circumferential surface of the vortex chamber.

In this case, since the rectifying passage extends outward in the radial direction from the inner circumferential surface of the relay chamber and is open at the inner circumferential surface of the vortex chamber, after the liquid which flows into the relay chamber from the first liquid chamber or the second liquid chamber in the axial direction is caused to flow through the rectifying passage in the radial direction, the liquid can be caused to flow into the vortex chamber from the inner circumferential surface of the vortex chamber in the circumferential direction. Thus, the liquid flowing into the vortex chamber from the rectifying passage can be easily accurately caused to rotate in accordance with the flow velocity thereof.

Advantageous Effects of Invention

According to the present invention, simplification of a structure and facilitation of manufacture can be achieved while product features are secured.

DESCRIPTION OF EMBODIMENTS

Hereinafter, an embodiment of a vibration-damping device related to the present invention will be described with reference to FIGS. 1 to 4.

Figure 1:
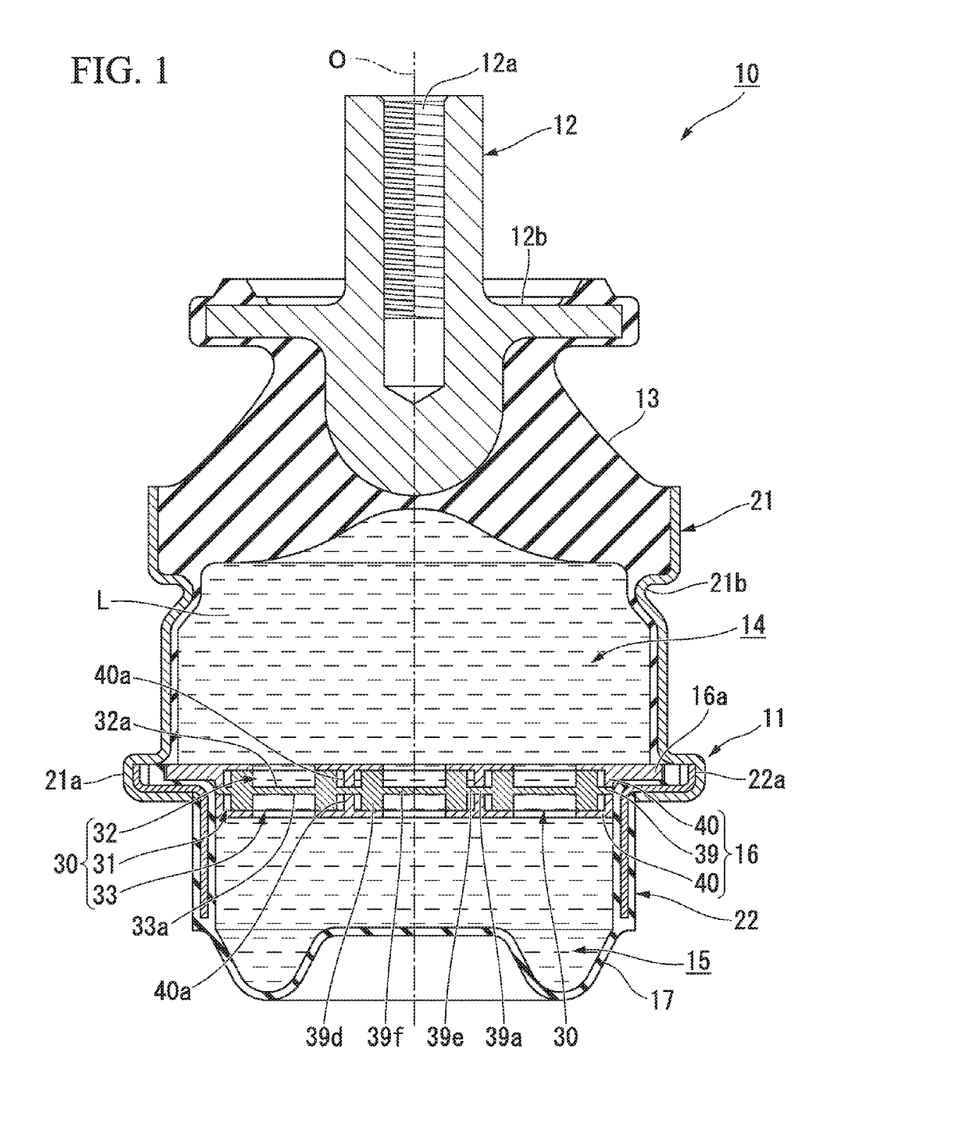
FIG. 1 is a longitudinal cross-sectional view of a vibration-damping device related to an embodiment of the present invention.

As shown in FIG. 1, a vibration-damping device 10 is provided with a tubular first attachment member 11 joined to one of a vibration generating unit and a vibration receiving unit, a second attachment member 12 joined to the other of the vibration generating unit and the vibration receiving unit, an elastic body 13 which joins the first attachment member 11 to the second attachment member 12, and a partition member 16 which partitions a liquid chamber in the first attachment member 11 in which a liquid L is sealed into a main liquid chamber (a first liquid chamber) 14 having the elastic body 13 as a portion of a wall surface thereof and a subsidiary liquid chamber (a second liquid chamber) 15.

In the illustrated example, the second attachment member 12 is formed in a columnar shape, the elastic body 13 is formed in a tubular shape, and the first attachment member 11, the second attachment member 12, and the elastic body 13 are disposed coaxially with a common axis. Hereinafter, the common axis is referred to as an axis O (an axis of the first attachment member), the main liquid chamber 14 side in an axial O direction (an axial direction of a vortex chamber) is referred to as one side, the subsidiary liquid chamber 15 side is referred to as the other side, a direction perpendicular to the axis O is referred to as a radial direction, and a direction around the axis O is referred to as a circumferential direction.

When the vibration-damping device 10 is mounted in, for example, a vehicle the second attachment member 12 is joined to an engine serving as a vibration generating unit, and the first attachment member 11 is joined to a vehicle body serving as a vibration receiving unit via a bracket (not shown), thereby suppressing vibrations of the engine from being transferred to the vehicle body. The vibration-damping device 10 is a liquid sealed type in which the liquid L such as, for example, ethylene glycol water, or silicone oil, is sealed in the liquid chamber of the first attachment member 11.

The first attachment member 11 is provided with a one-side outer rim body 21 on the one side in the axial O direction and an other-side outer rim body 22 on the other side.

The elastic body 13 is joined to an end of the one-side outer rim body 21 on the one side in a liquid-tight state, and an opening of the one-side outer rim 21 of the one side is closed by the elastic body 13. An end 21a of the one-side outer rim body 21 on the other side is formed larger in diameter than other portions. Also, an inside of the one-side outer rim body 21 is the main liquid chamber 14. A liquid pressure of the main liquid chamber 14 changes as the elastic body 13 is deformed when vibrations are input and an inner capacity of the main liquid chamber 14 is thus changed.

An annular groove 21b of the one-side outer rim body 21 which continuously extends throughout the entire circumference thereof about the axis O is formed in a portion connected from the other side to a portion of the one-side outer rim body 21 to which the elastic body 13 is joined.

A diaphragm 17 is joined to an end of the other-side outer rim body 22 on the other side in a liquid-tight state, and an opening of the other-side outer rim body 22 on the other side is closed by the diaphragm 17. An end 22a of the other-side outer rim body 22 on the one side is formed larger in diameter than other portions and is fitted into the end 21a of the one-side outer rim body 21 on the other side. The partition member 16 is fitted into the other-side outer rim body 22. A portion inside the other-side outer rim body 22 which is between the partition member 16 and the diaphragm 17 is the subsidiary liquid chamber 15. The subsidiary liquid chamber 15 has the diaphragm 17 as a portion of a wall surface and is expanded or contracted as the diaphragm 17 is deformed. The other-side outer rim body 22 is covered with a rubber membrane integrally formed with the diaphragm 17 over approximately the entire area.

A female threaded part 12a is formed on an end surface of the second attachment member 12 of the one side coaxially with the axis O. The second attachment member 12 protrudes from the first attachment member 11 toward the one side. A flange part 12b which protrudes outward in a radial direction and continuously extends throughout the entire circumference of the second attachment member 12 about the axis O is formed on the second attachment member 12. The flange part 12b is spaced apart from an edge of the first attachment member 11 on the one side, toward the one side.

The elastic body 13 is formed by an elastic member such as, for example, a rubber material and is formed in a tubular shape whose diameter is gradually increased from the one side to the other side. An end of the elastic body 13 on the one side is joined to the second attachment member 12, and an end thereof on the other side is joined to the first attachment member 11.

An inner circumferential surface of the one-side outer rim body 21 of the first attachment member 11 is covered with a rubber membrane integrally formed with the elastic body 13 over approximately the entire area.

The partition member 16 is formed in a discoid shape which is disposed coaxially with the axis O and is fitted into the first attachment member 11. The partition member 16 is provided with a flange part 16a which protrudes outward in a radial direction. The flange part 16a is provided at an end of the partition member 16 on the one side. The flange part 16a is disposed in the end 22a of the other-side outer rim body 22 on the one side.

Vortex chamber units 30 through which the main liquid chamber 14 communicates with the subsidiary liquid chamber 15 are formed in the partition member 16, and the main liquid chamber 14 and the subsidiary liquid chamber 15 communicate with each other only via the vortex chamber units 30.

Figure 2:
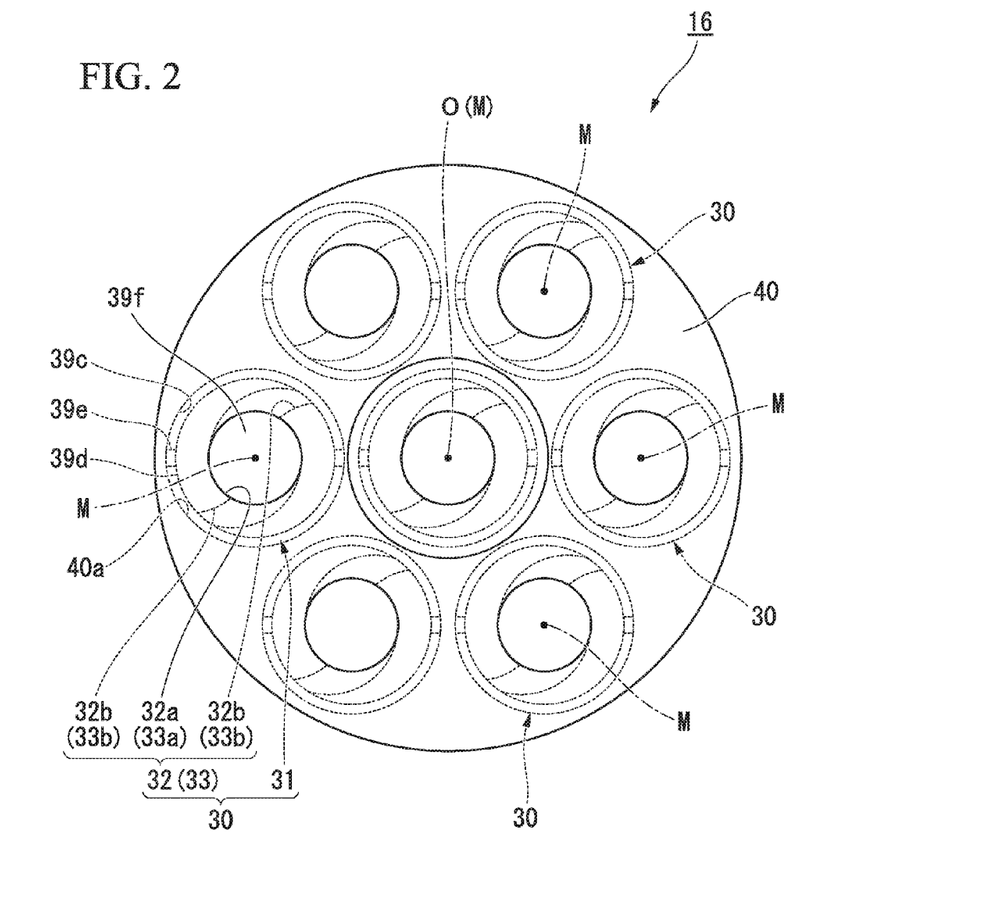
FIG. 2 is a plan view showing a partition member constituting the vibration-damping device shown in FIG. 1.

The plurality of vortex chamber units 30 are provided in the partition member 16. The plurality of vortex chamber units 30 are formed in the same shape and size. One vortex chamber unit 30 among the plurality of vortex chamber units 30 is disposed coaxially with the axis O and the remainder of the plurality of vortex chamber units 30 are disposed in the circumferential direction to surround the vortex chamber unit 30 disposed coaxially with the axis O from an outside in the radial direction.

Each of the vortex chamber units 30 is provided with an annular vortex chamber 31, a first communicating section 32 through which the vortex chamber 31 communicates with the main liquid chamber 4, and a second communicating section 33 through which the vortex chamber 31 communicates with the subsidiary liquid chamber 15.

A vortex chamber axis M serving as an axis of the vortex chamber 31 extends in parallel with the axis O in the axial O direction.

Figure 3:
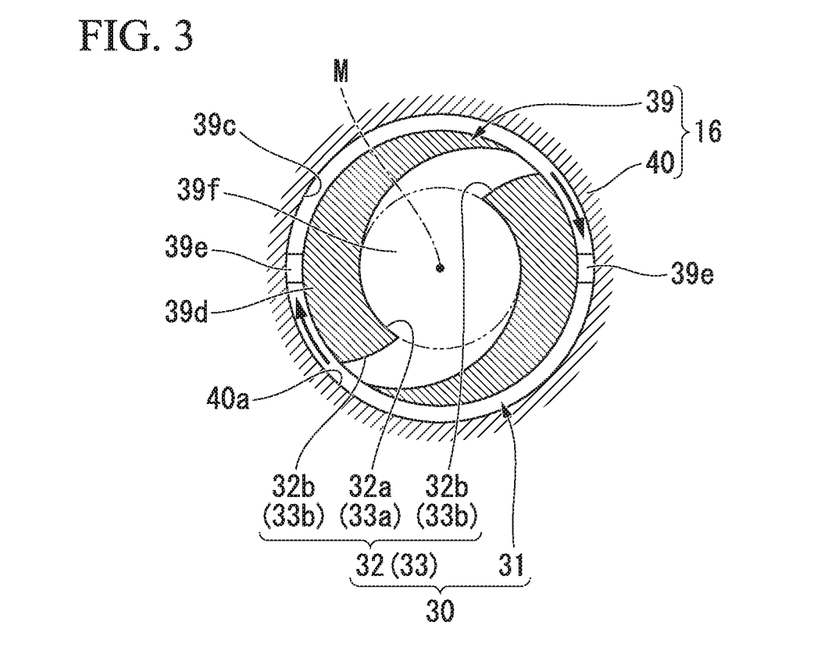
FIG. 3 is a lateral cross-sectional view showing a major part of the partition member shown in FIG. 2.
Figure 4:
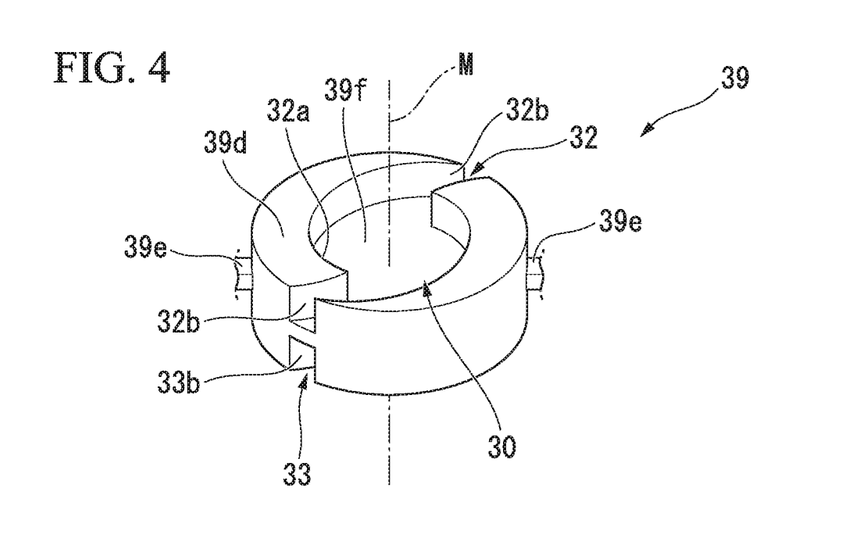
FIG. 4 is a longitudinal cross-sectional view showing a state in which the major part including a core section is exposed in the partition member shown in FIG. 2.

As shown FIGS. 2 to 4, the first communicating section 32 is provided with a first relay chamber 32a, and the second communicating section 33 is provided with a second relay chamber 33a.

The first relay chamber 32a and the second relay chamber 33a are disposed more inward in a radial direction of the vortex chamber 31 (hereinafter referred to as a vortex chamber radial direction) than the vortex chamber 31 and disposed coaxially with the vortex chamber axis M. Inner circumferential surfaces of the first relay chamber 32a and the second relay chamber 33a (an inner circumferential surface of a core part 39d to be described below which forms the first relay chamber 32a and the second relay chamber 33a) are formed in circular shapes about the vortex chamber axis M. The first relay chamber 32a communicates with one of the main liquid chamber 14 and the subsidiary liquid chamber 15 via an opening which is open in the axial O direction, and the second relay chamber 33a communicates with the other of the main liquid chamber 14 and the subsidiary liquid chamber 15 via an opening which is open in the axial O direction. In this embodiment, the first relay chamber 32a communicates with the main liquid chamber 14 via an opening which is open in the axial O direction, and the second relay chamber 33a communicates with the subsidiary liquid chamber 15 via an opening which is open in the axial O direction. The first relay chamber 32a and the second relay chamber 33a are formed to be symmetrical to each other in the axial O direction.

As shown in FIGS. 2 to 4 the first communicating section 32 is provided with first rectifying passages 32b, and the second communicating section 33 is provided with second rectifying passages 33b (here, at least one of the first rectifying passages 32b and the second rectifying passages 33b may be provided). The first rectifying passages 32b and the second rectifying passages 33b extend outward in the vortex chamber radial direction from a portion of the partition member 16, which is more inward in the vortex chamber radial direction than the vortex chamber 31, and are open at an inner circumferential surface (an outer circumferential surface of the core part 39d to be described below which forms the vortex chamber 31) of the vortex chamber 31, which faces the outside in the vortex chamber radial direction, in a direction around the vortex chamber axis M serving as a circumferential direction of the vortex chamber 31 (hereinafter referred to as a vortex chamber circumferential direction). In this embodiment, the first rectifying passages 32b and the second rectifying passages 33b extend outward in the vortex chamber radial direction from the inner circumferential surface of the first relay chamber 32a and the second relay chamber 33a which faces the inside in the vortex chamber radial direction (the inner circumferential surface of the core part 39d to be described below which form the first relay chamber 32a and the second relay chamber 33a) and are open at the inner circumferential surface of the vortex chamber 31 which faces the outside in the vortex chamber radial direction.

The first rectifying passages 32b are in communication with the first relay chamber 32a and the vortex chamber 31. A pair of first rectifying passages 32b are point-symmetrically disposed with respect to the vortex chamber axis M to surround the first relay chamber 32a in a planar view of the vortex a chamber 31 viewed from the axial O direction. The pair of first rectifying passages 32b extend from a first relay chamber 32a in a direction along an orthogonal plane perpendicular to the axis O.

The second rectifying passages 33b are in communication with the second relay chamber 33a and the vortex chamber 31. In the planar view, a pair of second rectifying passages 33b are point-symmetrically disposed with respect to the vortex chamber axis M to surround the second relay chamber 33a. The pair of second rectifying passages 33b extend from the second relay chamber 33a in the direction along the orthogonal plane.

The first rectifying passages 32b and the second rectifying passages 33b extend outward in the vortex chamber radial direction and gradually extend in common in one direction in the vortex chamber circumferential direction. The first rectifying passages 32b and the second rectifying passages 33b are formed in the same shape and size and are disposed to overlap each other in the planar view. The first rectifying passages 32b and the second rectifying passages 33b are gradually reduced in width from the inside to the outside in the vortex chamber radial direction in the planar view. Lateral surfaces of the first rectifying passages 32b and the second rectifying passages 33b which face the vortex chamber axis M are formed as convex curved surfaces which are convex in the other direction of the vortex chamber circumferential direction in the planar view.

In this embodiment, the vortex chamber 31 is formed to rotate a liquid L flow into the vortex chamber 31 from the first rectifying passages 32b and the second rectifying passages 33b in accordance with a flow velocity of the liquid L. The liquid L flowing into the vortex chamber 31 from the first rectifying passages 32b and the second rectifying passages 33b rotates to flow along the inner circumferential surface of the vortex chamber 31 which faces the outside in the vortex chamber radial direction.

As shown in FIG. 1, the partition member 16 is formed by three dividing bodies 39 and 40 including a central dividing body 39 and a pair of outer dividing bodies 40. The partition member 16 is formed such that the pair of outer dividing bodies 40 surround the central dividing body 39 in the axial O direction, and for example, the three dividing bodies 39 and 40 are fixed by fixing means (not shown) such as bolts in the axial O direction.

The central dividing body 39 includes a plate-shaped main body 39a which aces in the axial O direction. The main body 39a is disposed coaxially with the axis O. The main body 39a is formed with a plurality of through holes 39c constituting the vortex chambers 31. A tubular core part 39d extending in the axial O direction is disposed in each of the through holes 39c. A central portion of an outer circumferential surface of the core part 39d in the axial O direction is joined to the main body 39a via bridge sections 39e. A pair of bridge sections 39e are disposed to surround the core part 39d in the vortex chamber radial direction. The bridge sections 39e are disposed to be shifted in the vortex chamber circumferential direction with respect to outer openings of the first rectifying passages 32b and the second rectifying passages 33b in the vortex chamber radial direction. The pair of bridge sections 39e divide a communicating gap between the outer circumferential surface of the core part 39*d* and an inner circumferential surface of the through hole 39*c* into two gaps in the vortex chamber circumferential direction.

A partition plate 39*f* is disposed inside the core part 39*d*. Front and rear surfaces of the partition plate 39*f* face in the axial O direction, and an outer circumferential edge portion of the partition plate 39*f* is joined to the central portion of the inner circumferential surface of the core part 39*d* in the axial O direction. The partition plate 39*f* divides an inside of the core part 39*d* in the axial O direction, a portion in the core part 39*d* which is closer to the one side than the partition plate 39*f* is formed with the first relay chamber 32*a*, and a portion therein which is closer to the other side than the partition plate 39*f* is formed with the second relay chamber 33*a*. Portions of the core part 39*d* which are closer to the one side than the partition plate 39*f* are formed with the first rectifying passages 32*b*, and portions thereof which are closer to the other side than the partition plate 39*f* are formed with the second rectifying passages 33*b*.

The pair of outer dividing bodies 40 are formed in the same shape and size. The outer dividing bodies 40 are formed in a plate shape facing in the axial O direction and are disposed coaxially with the axis O. The outer dividing bodies 40 on the one side in the axial O direction are recessed toward the one side in the axial O direction and are provided with concave portions 40*a* which are open toward the other side in the axial O direction, and the outer dividing bodies 40 on the other side in the axial O direction are recessed toward the other side in the axial O direction and are provided with concave portions 40*a* which are open toward the one side in the axial O direction.

The core part 39*d* is accommodated in each of the concave portions 40*a*. A bottom surface of the concave portion 40*a* is in contact with an end surface of the core part 39*d* which faces in the axial O direction in a liquid-tight state. Through holes which have the same diameter as the first relay chamber 32*a* and the second relay chamber 33*a* pass through the bottom surface of the concave portion 40*a* in the axial O direction.

An inner circumferential surface of the concave portion 40*a* is outwardly spaced apart from the outer circumferential surface of the core part 39*d* in the vortex chamber radial direction. Thus, annular gaps which extend throughout the entire circumference in the vortex chamber circumferential direction are provided between the inner circumferential surface of the concave portions 40*a* and the outer circumferential surface of the core part 39*d*. In other words, a pair of annular gaps are provided to surround the central dividing body 39 in the axial O direction and communicate with each other via the communicating gap. The annular gaps and the communicating gap constitute the vortex chamber 31. The vortex chamber 31 has a circular inner circumferential surface.

An action of the vibration-damping device 10 constituted as described above will be described.

When vibrations in the axial O direction are input from the vibration generating unit to the vibration-damping device 10 as shown in FIG. 1, the first attachment member 11 and the second attachment member 12 are relatively displaced while elastically deforming the elastic body 13 so that a liquid pressure of the main liquid chamber 14 changes. Thus, the liquid L is caused to reciprocate between the main liquid chamber 14 and the subsidiary liquid chamber 15 via the vortex chamber units 30.

At this time, the liquid L in the main liquid chamber 14 is caused to flow toward the subsidiary liquid chamber 15 via the vortex chamber units 30. Thus, the liquid L flows into the vortex chamber 31 via the first relay chamber 32*a* and the first rectifying passages 32*b*. At this time, the liquid L passes through the first rectifying passages 32*b* so that a flow velocity of the liquid L can be increased.

Here, vibrations such as, for example, idle vibrations (for example, whose frequencies are 18 Hz to 30 Hz and whose amplitudes are ±0.5 mm or less) and shake vibrations (for example, whose frequencies are 14 Hz or less and whose amplitudes are greater than ±10.5 mm) lower in frequency and larger in amplitude than the idle vibrations are nor al input to the vibration-damping device 10. The idle vibrations among the vibrations have relatively small amplitudes but high frequencies, and the shake vibrations have low frequencies but great amplitudes. Therefore, when such normal vibrations are input, a flow velocity of the liquid L flowing into the vortex chamber 31 via the first rectifying passages 32*b* can be increased to a predetermined value or more in any case, and a swirl flow of the liquid L can be formed in the vortex chamber 31 as indicated by an arrow in FIG. 3. The swirl flow in the vortex a her 31 rotates in one direction in the vortex chamber circumferential direction.

As a result, pressure loss of the liquid L is increased due to, for example, viscous resistance of the liquid L energy loss occurring when the swirl flow is formed, energy loss due to friction between the liquid L and wall surfaces of the vortex chamber 31, and so on, and the vibrations are thus absorbed and attenuated. At this time, the flow rate of the liquid L flowing into the vortex chamber 31 is significantly increased in accordance with an increase in a flow velocity of the liquid L so that the vortex chamber 31 is sufficiently filled with the swirl flow formed by the liquid L flowing into the vortex chamber 31. When the liquid L is caused to further flow into the vortex chamber 31 in this state, the pressure loss of the liquid L can be more reliably increased.

After that the liquid L which is caused to rotate in the vortex chamber 31 flows out of the second rectifying passages 33*b* and flows into the subsidiary liquid chamber 15 via the second communicating section 33. The second rectifying passages 33*b* extend outward in the vortex chamber radial direction in common with the first rectifying passages 32*b* and extend in one direction in the vortex chamber circumferential direction. Because of this, a direction in which the liquid L rotates in the vortex chamber 31 in the vortex chamber circumferential direction and a direction in which the second rectifying passages 33*b* extend in the vortex chamber circumferential direction can be commonly set to be the one direction in the vortex chamber circumferential direction. Thus, it is difficult for the liquid L which rotates in the vortex chamber 31 to flow into the second rectifying passages 33*b*, and thus the liquid L can efficiently rotate in the vortex chamber 31. In other words, a sufficient distance to move the liquid L can be secured, and the pressure loss of the liquid L can thus be more reliably increased.

Also, when the liquid L in the subsidiary liquid chamber 15 is caused to flow toward the main liquid chamber 14 via the vortex chamber units 30, the liquid L flows into the vortex chamber 31 via the second relay chamber 33*a* and the second rectifying passages 33*b*. Even at this time, when the flow velocity of the liquid L is a predetermined value or more, the swirl flow of the liquid L can be formed in the vortex chamber 31 as indicated by the arrow in FIG. 3. Thus, the pressure loss of the liquid L is increased, and the vibrations are absorbed and attenuated. Incidentally, the swirl flow in the vortex chamber 31 rotates in the one direction in the vortex chamber circumferential direction similarly to the swirl flow of the liquid L which has flowed from the first rectifying passages 32b.

After that, the liquid L which is caused to rotate inside the vortex chamber 31 flows out of the first rectifying passages 32b and flows into the main liquid chamber 14 via the first communicating section 32. Here, the first rectifying passages 32b extend outward in the vortex chamber radial direction in common with the second rectifying passages 33b and extend in the one direction in the vortex chamber circumferential direction. Thus, the direction in which the liquid L rotates in the vortex chamber 31 in the vortex chamber circumferential dire-lion and a direction in which the first rectifying passages 32b extend in the vortex chamber circumferential direction can be commonly set to be the one direction in the vortex chamber circumferential direction. Thus, it is difficult for the liquid L which rotates in the vortex chamber 31 to flow into the first rectifying passages 32b, and thus the liquid L can efficiently rotate in the vortex chamber 31. In other words, a sufficient distance to move the liquid L can be secured, and the pressure loss of the liquid L can thus be more reliably increased.

Further, minute vibrations, for example, higher in frequency and remarkably smaller in amplitude than an assumed value, are unintentionally input to the vibration-damping device 10 in some cases. When the minute vibrations are input, the flow velocity of the liquid L flowing into the vortex chamber 31 via the first rectifying passages 32b and the second rectifying passages 33b is low. Thus, the rotation of the liquid L in the vortex chamber 31 is suppressed. When the swirl flow of the liquid L is not generated in the vortex chamber 31, the liquid L smoothly flows through the vortex chamber 31. Thus, an increase in a dynamic spring constant is suppressed.

As described above, according to the vibration-damping device 10 related to this embodiment, the swirl flow of the liquid L is formed in the vortex chamber 31 so that the pressure loss of the liquid L is increased, and the vibrations can thus be absorbed and attenuated. When normal vibrations such as, for example, idle vibrations and shake vibrations are input, the vibrations can be absorbed and attenuated in accordance with the flow velocity of the liquid L irrespective of the frequencies of the vibrations. Also, the first rectifying passages 32b and the second rectifying passages 33b are open at the inner circumferential surface of the vortex chamber 31 which faces the outside in the vortex chamber radial direction (the outer circumferential surface of the core part 39d which forms the vortex chamber 31 in the vortex chamber circumferential direction. Thus, the size of the swirl flow is secured by increasing the outer diameter of the vortex chamber 31, and the pressure loss of the liquid L can thus be reliably increased. Also, the first rectifying passages 32b and the second rectifying passages 33b are disposed inside in the vortex chamber radial direction. Thus, the compactness of the vibration-damping device 10 can be realized. Therefore, simplification of a structure and facilitation of manufacture can be achieved while a plurality of kinds of vibrations having different frequencies are absorbed and attenuated.

Also, an increase in a dynamic spring constant can be suppressed in a state in which the flow velocity is low and the rotation of the liquid L in the vortex chamber 31 is suppressed. When the flow velocity of the liquid L is lower than that when normal vibrations are input, such as when unintentional vibrations such as, for example, minute vibrations higher in frequency and remarkably smaller in amplitude than the normal vibrations are input, an increase in the dynamic spring constant can be suppressed. Thus, product features of the vibration-damping device 10 can be easily secured.

Also, the first rectifying passages 32b are included in the first communicating section 32, and the second rectifying passages 33b are included in the second communicating section 33. Thus, the liquid L flowing from the main liquid chamber 14 to the subsidiary liquid chamber 15 is caused to flow into the vortex chamber 31 via the first rectifying passages 32b so that the pressure loss of the liquid L can be increased. In addition, the liquid L flowing from the subsidiary liquid chamber 15 to the main liquid chamber 14 is also caused to flow into the vortex chamber 31 via the second rectifying passages 33b so that the pressure loss of the liquid L can be increased. Thus, the vibrations can be effectively absorbed and attenuated.

Also, the first rectifying passages 32b and the second rectifying passages 33b extend outward in the vortex chamber radial direction from the inner circumferential surfaces of the first relay chamber 32a and the second relay chamber 33a and open at the inner circumferential surface of the vortex chamber 31. Thus, the liquid L flowing from the main liquid chamber 14 to the first relay chamber 32a in the axial O direction can be caused to flow via the first rectifying passages 32b in the vortex chamber radial direction and then flow into the vortex chamber 31 from the inner circumferential surface of the vortex chamber 31 in the vortex chamber circumferential direction. Also, the liquid L flowing from the subsidiary liquid chamber 15 to the second relay chamber 33a in the axial O direction can be caused to flow via the second rectifying passages 33b in the vortex chamber radial direction and then flow into the vortex chamber 31 from the inner circumferential surface of the vortex chamber 31 in the vortex chamber circumferential direction. Thus, the liquid L flowing from the first rectifying passages 32b and the second rectifying passages 33b to the vortex chamber 31 can be easily and accurately caused to rotate in accordance with the flow velocity thereof.

Note that the technical scope of the present invention is not limited to this embodiment and can be modified in various ways without departing from the spirit of the present invention.

In the present invention, constitutions of the first rectifying passages 32b and the second rectifying passages 33b are not limited to those shown in this embodiment.

Figure 5:
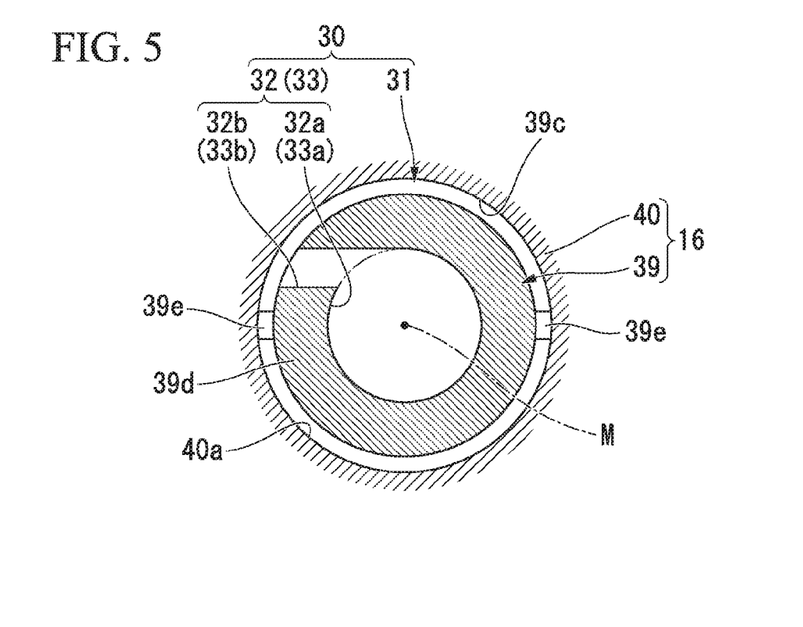
FIG. 5 is a lateral cross-sectional view showing a major part of a partition member constituting a vibration-damping device related to a first modified embodiment of the present invention.
Figure 6:
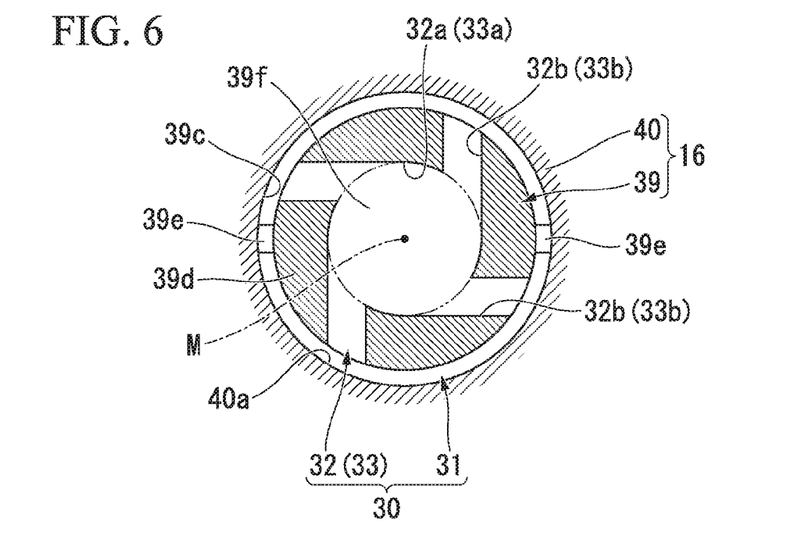
FIG. 6 is a lateral cross-sectional view showing a major part of a partition member constituting a vibration-damping device related to a second modified embodiment of the present invention.

For example, as shown in FIGS. 5 and 6, in the planar view, a first rectifying passage 32b and a second rectifying passage 33b may be formed in the same width the entire length from the inside to the outside in the vortex chamber radial direction. Incidentally, the first rectifying passage 32b and the second rectifying passage 33b extend in tangential directions of the inner circumferential surfaces from the inner circumferential surfaces of a first relay chamber 32a and a second relay chamber 33a (the inner circumferential surface of a core part 39d which forms the first relay chamber 32a and the second relay chamber 33a).

Also, as shown in FIGS. 5 and 6, one first rectifying passage 32b and one second rectifying passage 33b may be provided, or a plurality of first rectifying passages 32b and a plurality of second rectifying passages 33b may be provided.

Also, in this embodiment, the first rectifying passage 32b and the second rectifying passage 33b extend outward in a liquid chamber radial direction and gradually extend in common in the one direction in the vortex chamber circumferential direction, but the present invention is not limited thereto. For example, the first rectifying passage and the second rectifying passage may extend outward in the liquid chamber radial direction and extend in different directions around a liquid chamber axis.

In this embodiment, the first communicating section 32 and the second communicating section 33 are provided with relay chambers 32a and 33a, respectively, but the present invention is not limited thereto. For example, the rectifying passages may be directly joined to the main liquid chamber or the subsidiary liquid chamber without the relay chambers.

Also, in this embodiment, the rectifying passages (the first rectifying passage 32b and the second rectifying passage 33b) are included in both of the first communicating section 32 and the second communicating section 33, but the present invention is not limited thereto. For example, the rectifying passages may be appropriately changed to another form in which the rectifying passages are provided in at least one of the first communicating section and the second communicating section.

The vortex chamber 31 is not limited to the chamber shown in this embodiment and may be appropriately changed to another annular constitution in which the vortex chamber 31 rotates a liquid flowing into an inside thereof from the rectifying passages in accordance with a flow velocity thereof.

In this embodiment, the main liquid chamber 14 and the subsidiary liquid chamber 15 communicate with each other only via the vortex chamber unit 30, but the present invention is not limited thereto. For example an orifice which passes through the main liquid chamber and the subsidiary liquid chamber may be provided in the partition member independently from the vortex chamber unit. A constitution in which resonance (liquid column resonance) occurs when a liquid flows in the orifice can be adopted as the orifice.

In this embodiment, the partition member 16 partitions the liquid chamber in t first attachment member 11 into the main quid chamber 14 having the elastic body 13 as a portion of the wall surface thereof and the subsidiary liquid chamber 15, but the present invention is not limited thereto. For example, a pair of elastic bodies may be provided in the axis direction without providing the diaphragm, and a pressure receiving liquid chamber having an elastic body as a portion of a wall surface thereof may be provided without providing the subsidiary liquid chamber. In other words, the constitution of the present invention may be appropriately changed to another constitution in which the partition member partitions the liquid chamber in the first attachment member in which the liquid is sealed into the main liquid chamber and the subsidiary liquid chamber, and at least one of the main liquid chamber and the subsidiary liquid chamber has an elastic body as a portion of the wall surface thereof.

In this embodiment, the case in which the engine is joined to the second attachment member 12, and the first attachment member 11 is joined to the vehicle body has been described, but the vehicle body may be joined to the second attachment member 12, and the first attachment member 11 may be joined to the engine.

The vibration-damping device 10 related to the present invention is not limited to an engine mount of the vehicle and can also be applied to components other than the engine mount. For example, the vibration-damping device 10 can also be applied to mounts of electric generators mounted on construction machines or can also be applied to mounts of machines installed at factories or the like.

In addition, the constituent elements of the above-described embodiments can be appropriately replaced with well-known constituent elements without departing from the gist of the present invention, and appropriately combined with the modified examples described above.

INDUSTRIAL APPLICABILITY

According to the present invention, simplification of a structure and facilitation of manufacture can be achieved while product features are secured.

REFERENCE SIGNS LIST

10 Vibration-damping device
11 First attachment member
12 Second attachment member
13 Elastic body
14 Main liquid chamber (first liquid chamber)
15 Subsidiary liquid chamber (second liquid chamber)
16 Partition member
30 Vortex chamber unit
31 Vortex chamber
32 First communicating section
32a First relay chamber
32b First rectifying passage
33 Second communicating section
33a Second relay chamber
33b Second rectifying passage
L Liquid

The invention claimed is:

1. A vibration-damping device in which at least one of a first liquid chamber and a second liquid chamber has an elastic body as a portion of a wall surface thereof, the vibration-damping device comprising:

a tubular first attachment member joined to one of a vibration generating unit and a vibration receiving unit;

a second attachment member joined to the other of the vibration generating unit and the vibration receiving unit;

the elastic body which joins the first attachment member to the second attachment member; and a partition member which partitions a liquid chamber in the first attachment member in which a liquid is sealed into the first liquid chamber and the second liquid chamber, wherein the partition member is formed with a vortex chamber unit through which the first liquid chamber communicates with the second liquid chamber, the vortex chamber unit is provided with an annular vortex chamber, a first communicating section through which the vortex chamber communicates with the first liquid chamber, and a second communicating section through which the vortex chamber communicates with the second liquid chamber, and at least one of the first communicating section and the second communicating section includes a rectifying passage which extends outward in a radial direction from a portion of the partition member which is more inward in a radial direction of the vortex chamber than the vortex chamber and are open at an inner circumferential surface of the vortex chamber which faces the outside in the radial direction in a circumferential direction of the vortex chamber, the vortex chamber includes an annular gap which extends throughout an entire circumference in the circumferential direction of the vortex chamber, and the vortex chamber is formed to rotate a liquid flowing into the vortex chamber from the rectifying passage in accordance with a flow velocity thereof.

2. The vibration-damping device according to claim 1, wherein the rectifying passage is included in both of the first communicating section and the second communicating section.

3. The vibration-damping device according to claim 2, wherein a first rectifying passage included in the first communicating section as the rectifying passage and a second rectifying passage included in the second communicating section as the rectifying passage extend outward in the radial direction and gradually extend in common in one direction in the circumferential direction.

4. The vibration-damping device according to claim 1, wherein a communicating section of the first communicating section and the second communicating section which is included in the rectifying passage is provided with a relay chamber of the partition member which is more inward in the radial direction than the vortex chamber,
   the relay chamber is configured to communicate with the first liquid chamber or the second liquid chamber via an opening which is open in an axial direction of the vortex chamber, and
   the rectifying passage extends outward in the radial direction from an inner circumferential surface of the relay chamber which faces the inside in the radial direction and is open at the inner circumferential surface of the vortex chamber.

* * * * *